Oct. 4, 1949.                    J. N. PAQUIN                    2,483,982
              FLARING TOOL WITH MULTIPLE TUBE HOLDER
                  AND TOOLHOLDER GUIDING MEANS
                       Filed Oct. 7, 1947
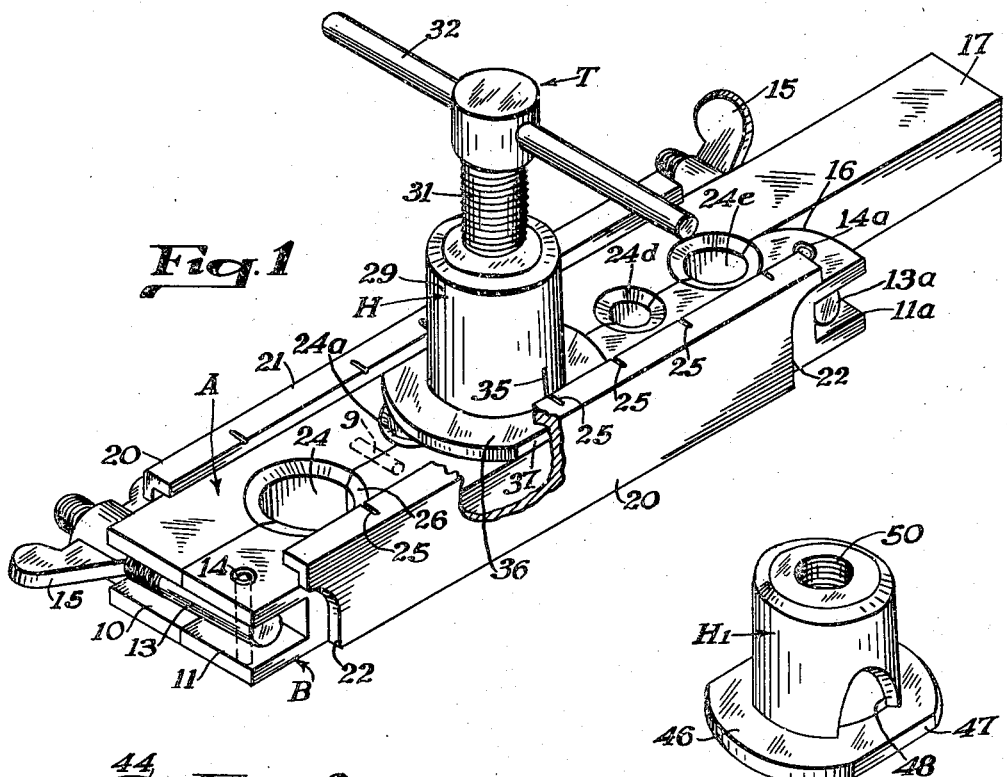
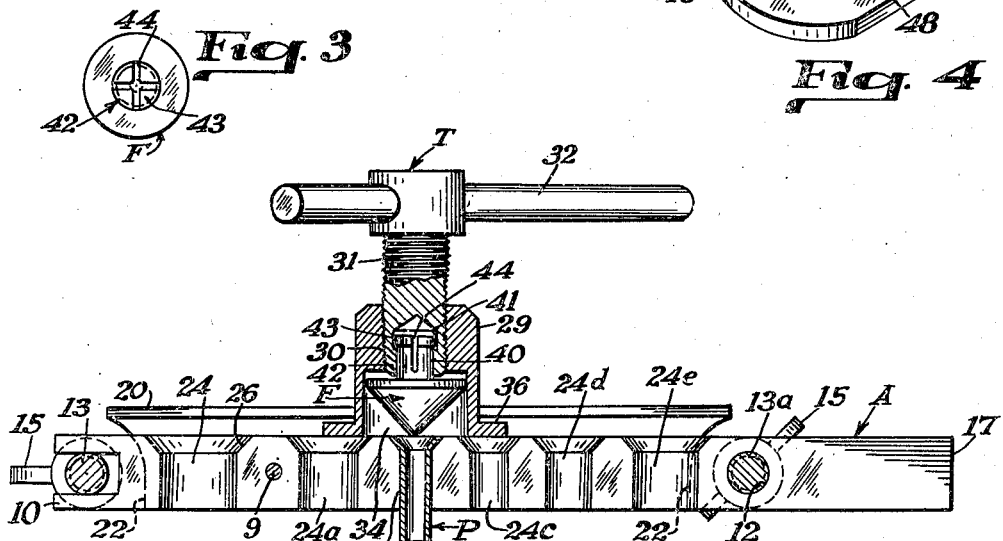
INVENTOR.
JOSEPH N. PAQUIN.
BY *Richey + Watts*
ATTORNEYS.

Patented Oct. 4, 1949

2,483,982

UNITED STATES PATENT OFFICE 2,483,982

FLARING TOOL WITH MULTIPLE TUBE HOLDER AND TOOLHOLDER GUIDING MEANS

Joseph N. Paquin, Euclid, Ohio, assignor to The Weatherhead Company, Cleveland, Ohio, a corporation of Ohio Application October 7, 1947, Serial No. 778,428

6 Claims. (Cl. 153—79)

This invention relates to tools for flaring the ends of metal tubing so that the tubing may be used in connection with fluid couplings or other fittings.

It is an object of this invention to provide a flaring tool that is capable of flaring a number of different sizes of tubing, which tool comprises a minimum number of parts that are readily manipulated. Briefly, this is accomplished by providing a tube holder in the form of a pair of blocks having a plurality of aligned recesses to accommodate tubes of different diameters and which blocks have guide means that mount a flaring tool holder so that it may be slid along the blocks and positioned over a selected tube retaining recess for flaring.

It is a further object to provide a tube flaring tool having means whereby the flaring head is readily positioned so that it is accurately centered with the axis of the tube to be flared.

Still another object resides in simplifying the swivel connection between the tube flaring head and its threaded operator means so that both machining and assembly costs are reduced.

These and other objects will appear as the following detailed description of the invention proceeds.

In the drawings:

Fig. 1 is a perspective view of the tool;

Fig. 2 is a longitudinal section taken on the midline of the tool;

Fig. 3 is a plan view of a flaring head; and

Fig. 4 shows a modified tool holding sleeve.

The tube flaring tool comprises five basic elements, a pair of elongated tube holders or blocks A and B, a tool holder H, a flaring head F, and a flaring head operator T threaded in the holder H. The flaring head H and its operator T are assembled together and will be designated collectively as tube flaring means. The ends of blocks A and B are notched as at 10 and 11, respectively, at one end and the block B is notched as at 11a at the other end, which notch is in alignment with aperture 12 in the block A. A dowel pin 9 may be provided to assure alignment of the blocks. The blocks may be clamped together to retain the tube for flaring by means of a pair of threaded bolts 13 and 13a pivoted to block B by pins 14 and 14a, and carrying wing nuts 15 for drawing the blocks together. One end of block B is relieved as at 16 to permit pivoting about pin 14a. With this construction, when the wing nuts 15 are loosened bolt 13 may be swung clear of block A whereupon blocks A and B may be separated by pivotal motion about the pivot pin 14a. Block A may have an extended portion 17 clamped in a vice during the flaring operation.

In order to slidably position the tool holder H in alignment with the axis of the tube to be flared, a pair of guide channels 20 are welded or otherwise fastened to each of the tube holder blocks A and B. These channels have overhanging flanges 21 which are in spaced relation to the upper surfaces of the blocks and the ends may be cut away as at 22 to provide clearance for the bolts at block A. Each block is formed with a series of semi-cylindrical recesses 24 and 24a, 24b, etc., which cooperate to form tube gripping bores when the blocks are brought together and clamped about the tube. The recesses have flared or tapered mouth portions 26 to receive the end of the tube during the flaring operation. A series of index marks such as 25 are provided on the channel members 20, which marks are aligned with the axis of the corresponding tube recesses 24, 24a, etc.

The tool holder H has a generally cylindrical body portion 29 which has a threaded bore 30 for receiving a threaded shank 31 of the flaring head operator T. Suitable handle means 32 are provided to facilitate turning the shank 31. The conical flaring head F is assembled with the operator T to form the tube flaring means, and member F moves axially in enlarged recess portion 34 in the tool holder H. The base of the tool holder H is flanged as at 36 which flange fits within the channel formed between lip 21 and the upper surface of the tube holders A and B. I prefer that the diameter of flange 36 be greater than the aggregate width of the two block members so that the flange may be cut away as at 37. In this construction, although the tool holder H can slide along the block members, it cannot rotate relative thereto during the flaring operation. I may provide an index mark 35 on the body 29 which is so arranged that when this mark is aligned with a selected index mark 25 the axis of the flaring head F coincides with the axis of the tube to be flared.

The flaring head F is rotatably mounted in the shank 31. The shank has a bore 40 terminating in an enlarged recess or socket 41. The head F has a shank portion 42 integral therewith and the shank is slotted as at 44. Enlargements 43 are formed at the end of the shank and, due to the slotting thereof, the shank may be pressed into place whereupon enlargements 43 snap into recess 41 and retain the flaring head F in place. This construction permits relative rotation between part F and the threaded shank, and greatly simplifies machining and assembly operations. No retaining nuts, washers or the like are required and the head is assembled with its operator by a simple snap operation. Likewise, an assembly of minimum overall length is provided. Of course, the location of shank 42 and socket 41 could be reversed.

In operation, the clamps are released, bars A and B opened, and the tube P to be flared is positioned in the recess of the proper diameter in bar A, it being understood that the tool may be mounted in a vice by means of extension 17. The bars are then closed and clamped by means of the screw and wingnut assemblies. Following this, the tool holder H is moved along the block members until it overlies the tube to be flared. A precise alignment is obtained by aligning the index mark 35 on the holder with a selected index mark 25 on one of the channel members. When this is done the tube is readily flared by rotation of the flaring tool operator T. The operator holds the holder H so that the indices remain aligned until the conical head F enters the tube. From this point on, the holder cannot move to another aperture and the conical head F will automatically center itself in the tube.

Although in a preferred form I show index marks 35 and 25 for effecting precise alignment of the parts, as seen in Fig. 4, I could also provide a window for visual alignment. In this form the tool holder H has a threaded bore 50, a flange 46 cut away as at 47, all of which function in a manner previously described. However, the wall of the holder may be cut away as at 48 to provide one or more windows whereby the operator can directly observe the relative position of the flared head and the tube to be flared and thereby line up the parts before commencing the flaring operation.

Having provided a detailed description of a preferred embodiment, it will be understood that various changes in design and construction of the tool may be made without departing from the essence of the invention. Accordingly, I contemplate that the appended claims and not the described embodiment be determinative of the scope of my invention.

What is claimed is:

1. A tube flaring tool comprising a pair of elongated tube holders, said holders having a plurality of recesses that cooperate to form assorted tube gripping bores with flaring mouths when the holders are assembled together, said bores having a common centerline, a guide channel formed in each tube holder parallel to the centerline common to the recesses and including a flange projecting toward said centerline and overlying the face of its holder, a tool holder mounted for motion along said tube holders between said flanges and having flange means slidable in said channels, and a tube flaring tool member threadedly mounted in said tool holder.

2. A tube flaring tool comprising a pair of elongated tube holders, said holders having a plurality of recesses that cooperate to form assorted tube gripping bores with flaring mouths when the holders are assembled together, said bores having a common centerline, an inwardly facing guide channel formed in each holder parallel to the centerline common to the recesses, a tool holder mounted for motion along said tube holders and having lower flange means slidable in said channels, a portion of said tool holder having a straight edge parallel to the axis of said bores and engaging a guide channel to prevent rotation of said holder, and tube flaring means threadedly mounted in said tool holder.

3. A tube flaring tool comprising a pair of elongated tube holders, said holders having a plurality of recesses that cooperate to form assorted tube gripping bores with flaring mouths when the holders are assembled together, said bores having a common centerline, an inwardly facing guide channel formed in each holder parallel to the centerline common to the recesses, a tool holder mounted for motion along said tube holders and having lower flange means slidable in said channels, the portions of said flange means sliding in said channels having flat edges for engaging a channel wall to prevent rotation of the tool holder, and tube flaring means threadedly mounted in said tool holder.

4. A tube flaring tool comprising a pair of elongated tube holders, said holders having a plurality of recesses that cooperate to form assorted tube gripping bores with flaring mouths when the holders are assembled together, said bores having a common centerline, a guide member having an L-shaped section attached to the outside of each holder parallel to the centerline common to the recesses, said guide member and the upper face of the associated holder cooperating to form a guide channel, a tool holder mounted for motion along said tube holders and having flange means slidable in said channels with the parts assembled, and tube flaring means threadedly mounted in said tool holder.

5. A tube flaring tool comprising a pair of elongated tube holders, said holders having a plurality of recesses that cooperate to form assorted tube gripping bores with flaring mouths when the holders are assembled together, said bores having aligned center lines, a guide channel formed in each holder parallel to the center line common to the recesses, a tool holder comprising an inverted cup-like member, the rim of said cup-like member having extending therefrom an annular flange and the bottom of said member having an axially threaded aperture, said flange being slidably mounted for motion along said tube holders and having flange means slidable in said channels, and a tube flaring tool member threadedly mounted in the aperture in said cup-like member.

6. A tube flaring tool comprising a pair of elongated tube holders, said holders having a plurality of recesses that cooperate to form assorted tube gripping bores with flaring mouths when the holders are assembled together, said bores having a common center line, an inwardly facing guide channel formed in each holder parallel to the center line common to the recesses, a tool holder mounted for motion along said tube holders and having flange means slidable in said channels, a tube flaring tool member threadedly mounted in said tool holder, at least one of said channels including a guide surface parallel to the centerline of said recesses, said tool holder having guide means engaging said channel guide surfaces at longitudinally spaced points to prevent rotation of said holder, and indices on said tool holder and said guide channel to facilitate alignment of the tool and tube holders.

JOSEPH N. PAQUIN.

REFERENCES CITED

The following references are of record in the file of this patent:

UNITED STATES PATENTS

| Number | Name | Date |
|---|---|---|
| 813,178 | Smith | Feb. 20, 1906 |
| 881,691 | Hughes | Mar. 10, 1908 |
| 1,350,904 | Walters | Aug. 24, 1920 |
| 1,724,697 | Dobrick | Aug. 13, 1929 |
| 1,754,637 | McGough | Apr. 15, 1930 |
| 1,840,470 | Schneider | Jan. 12, 1932 |
| 1,986,025 | Stecher | Jan. 1, 1935 |
| 2,089,133 | Parker | Aug. 3, 1937 |
| 2,424,871 | Wenk | July 29, 1947 |